United States Patent
Burda et al.

(10) Patent No.: US 7,392,105 B2
(45) Date of Patent: Jun. 24, 2008

(54) METHOD AND SYSTEM FOR IMPROVED PERFORMANCE OF MANUFACTURING PROCESSES

(75) Inventors: Richard G. Burda, Pleasant Valley, NY (US); Aseem K. Joshi, Wappingers Falls, NY (US); Sameer T. Shikalgar, Wappingers Falls, NY (US); Susan Kangas van Oss, LaGrangeville, NY (US); Patrick R Varekamp, Croton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 11/380,536

(22) Filed: Apr. 27, 2006

(65) Prior Publication Data

US 2007/0255440 A1    Nov. 1, 2007

(51) Int. Cl.
*G06F 19/00* (2006.01)

(52) U.S. Cl. .................. 700/101; 700/99; 700/100; 700/102

(58) Field of Classification Search .............. 700/90, 700/95, 97, 99–102
See application file for complete search history.

(56) References Cited

U.S. PATENT DOCUMENTS

| | | | | |
|---|---|---|---|---|
| 5,612,886 | A  * | 3/1997 | Weng | 700/101 |
| 5,751,580 | A  * | 5/1998 | Chi | 700/101 |
| 6,259,959 | B1 | 7/2001 | Martin | |
| 6,725,113 | B1 * | 4/2004 | Barto et al. | 700/99 |
| 6,868,298 | B2 * | 3/2005 | Baweja et al. | 700/100 |
| 7,054,703 | B2 * | 5/2006 | Wu et al. | 700/100 |
| 7,174,232 | B2 * | 2/2007 | Chua et al. | 700/102 |
| 7,179,664 | B2 * | 2/2007 | Huang et al. | 438/14 |
| 7,257,454 | B2 * | 8/2007 | Chien | 700/101 |

OTHER PUBLICATIONS

Stephen J. Shea, et al, "Development and Implementation the Range Management System in a Multi-Flow Fabricator", 1997 IEEE/SEMI Advanced Semiconductor Manufacturing Conference, p. 398-404.

* cited by examiner

*Primary Examiner*—Alexander J Kosowski
(74) *Attorney, Agent, or Firm*—James J. Cioffi; Greenblum & Bernstein P.L.C.

(57) ABSTRACT

A system and method including identifying a stopped range, identifying at least one lot of WIP associated with the stopped range, and processing the at least one lot in at least one operation within the stopped range at a lower priority relative to other lots. The system and method may be implemented as part of a range management system.

18 Claims, 4 Drawing Sheets

US 7,392,105 B2

METHOD AND SYSTEM FOR IMPROVED PERFORMANCE OF MANUFACTURING PROCESSES

FIELD OF THE INVENTION

The invention relates generally to the management of manufacturing processes, and more particularly to the implementation of work flow stops in a factory controlled by lean manufacturing principles.

BACKGROUND OF INVENTION

Semiconductor manufacturers are continually working to reduce time-to-market in an effort to improve serviceability while decreasing operating costs. This is particularly true for fabrication facilities that produce high volumes (on the order of 1,000 wafer starts per day) of complex products. As such, efforts have been made to develop and implement systems and methods, such as lean manufacturing and continuous flow manufacturing, to improve manufacturing process performance.

Range management is a production control methodology that employs lean manufacturing principles. In range management systems, wafer processing is partitioned into a series of flows, where the products in each flow follow similar routes through the fabrication facility. These flows are divided into ranges, and each range may include one or more operations. An operation is where the units (e.g., wafers) of a production lot are actually worked on, and may include, for example: lithography, metrology, overlay, metrology CD, etc. Normally, a particular lot spends twenty-four hours (e.g., a range day) in a range, and then is moved to the next range. Of the twenty-four hours, the lot may, for example, undergo six hours of processing time in the operations of the range, sixteen hours of non-processing time waiting in a queue, and two hours of transit time being moved between operations and/or other ranges. Thus, it is possible for numerous lots to be processed through a single range a twenty-four hour period.

Typically, new production lots are started every day, and a particular lot may undergo processing in seventy or more ranges before it is complete. Also, different lots may result in different end products, thereby requiring different operations during their manufacture. As such, there may be thousands of active lots in the fabrication facility at any one time, with those lots being dispersed amongst the numerous operations of the fabrication facility. Moreover, a given operation is not necessarily unique to a particular range. The same operation may be included in different ranges in the same flow and/or different ranges of different flows. As a result, it is common for plural lots to simultaneously require processing in the same operation, thereby necessitating that some lots wait in a queue while another lot is processed in the operation.

Range management systems are used to manage the flow of the production lots through the fabrication facility. Range management systems focus on delivering work in progress (WIP) (e.g., lots or units in a lot) on a known route at a known speed to meet committed customer deliveries on schedule. This is accomplished, at least in part, by creating daily production targets for each range and then controlling the fabrication facility by managing the WIP in the individual ranges.

Disruptions in product flow (e.g., a broken machine or tool), however, can cause elevated WIP levels in ranges. Conventional range management systems constrict product flow into ranges with elevated WIP in order to keep product cycle times predictable. Flow is constricted by "stopping" a range that is directly upstream of a range with elevated WIP. The effect of "stopping" a range is that none of the WIP in the stopped range will undergo any processing during the range day. While range stops are necessary for flow control for keeping product cycle times predictable, factory resources are not fully utilized when WIP is stopped.

Accordingly, there exists a need in the art to overcome the deficiencies and limitations described hereinabove.

SUMMARY OF THE INVENTION

In a first aspect of the invention, a method includes identifying a stopped range, identifying at least one lot of WIP associated with the stopped range, and processing the at least one lot in at least one operation within the stopped range at a lower priority relative to other lots.

In a second aspect of the invention, a method of implementing range stops in a fabrication facility controlled by range management includes identifying a stopped range, identifying WIP associated with the stopped range and WIP not associated with the stopped range, and processing the WIP associated with the stopped range and the WIP not associated with the stopped range based on priorities assigned thereto.

In a third aspect of the invention, a system for prioritizing a plurality of lots includes at least one device that performs: identifying a stopped range; identifying at least one lot of WIP associated with the stopped range; assigning a first priority to the at least one lot of WIP; assigning a second priority to at least one other lot of WIP that is not associated with the stopped range; and controlling processing of the at least one lot of WIP and the at least one lot of other WIP in an operation contained in the stopped range based at least partly on the first priority and the second priority. The at least one device may comprise a computer usable medium including a computer readable program, wherein the computer readable program, when executed on a computer, causes the computer to perform the identifying a stopped range, the identifying at least one lot of WIP, the assigning a first priority, the assigning a second priority, and the controlling processing.

BRIEF DESCRIPTION OF THE DRAWINGS

The foregoing will be better understood from the following detailed description of embodiments of the invention with reference to the drawings, in which.

DETAILED DESCRIPTION OF EMBODIMENTS OF THE INVENTION

The invention is directed to a system and method for managing manufacturing processes. According to the invention, a system and method are provided for implementing range stops. By allowing WIP in a stopped range to flow at a reduced priority within the stopped range, factory resources reach a higher level of utilization and the productivity of the factory is improved. Moreover, the controlled movement of WIP within stopped ranges improves the staging of the WIP within those ranges, thereby allowing the factory to recover more quickly after a flow disruption. In embodiments, range management, and, therefore, predictable cycle time, is maintained by not letting WIP exit a stopped range. In accordance with range management guidelines, the improved performance provided by implementations of the invention can be used to raise factory output or reduce cycle time while keeping output the same.

Figure 1:
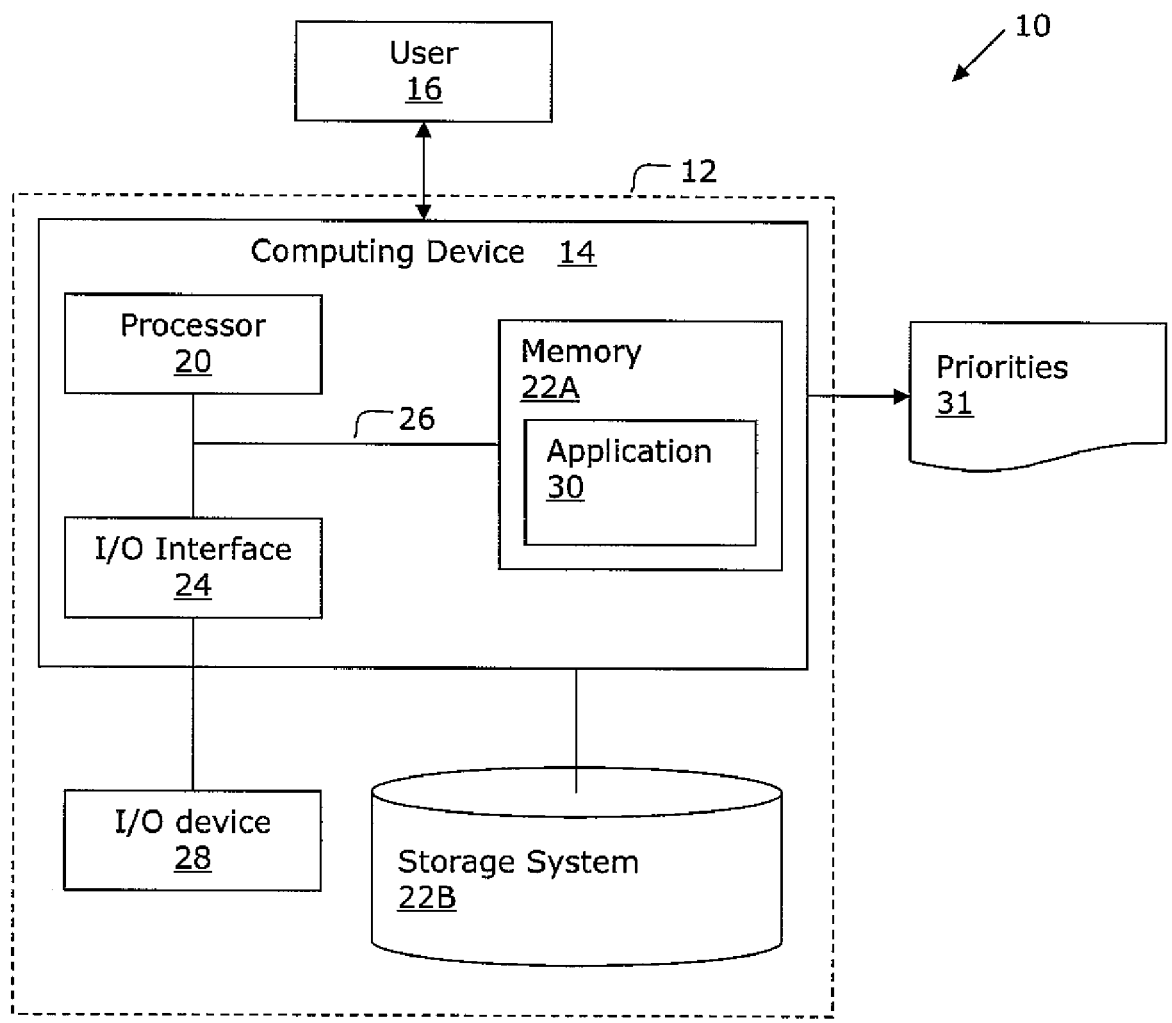
FIG. 1 shows an environment of the invention.

FIG. 1 shows an illustrative environment 10 for managing the processes in accordance with embodiments of the invention. To this extent, the environment 10 includes a computer infrastructure 12 that can perform the processes described herein, such as, for example, managing manufacturing processes in a facility. In particular, the computer infrastructure 12 is shown including a computing device 14 that comprises an application 30, which makes computing device 14 operable to perform the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. As is known in the art, in general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. As discussed herein, the application 30 enables computer infrastructure 12 to create various priorities 31.

Figure 2:
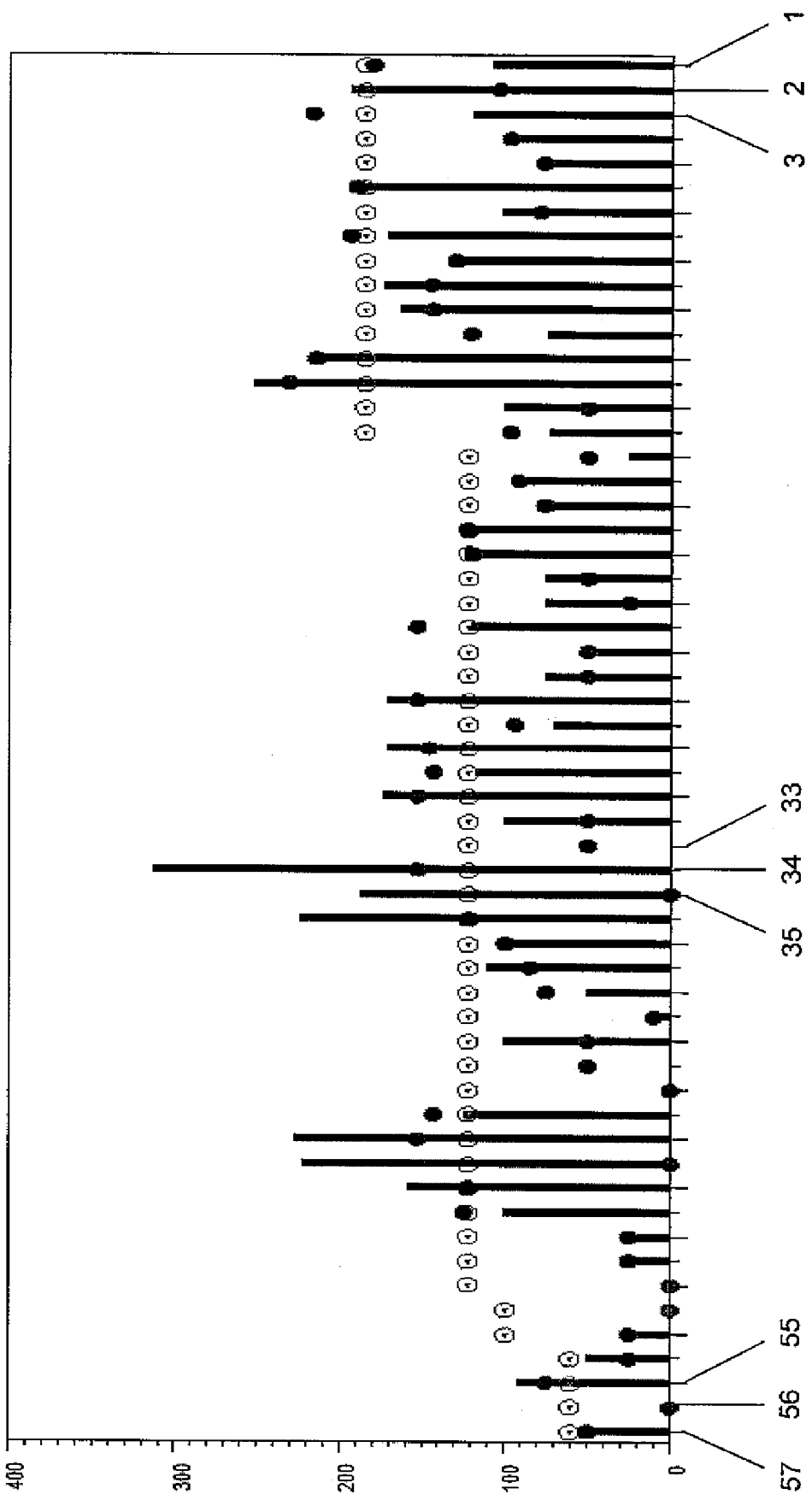
FIG. 2 shows an aspect of the invention.

FIG. 2 shows an exemplary flow that is divided into ranges in a fabrication facility that is controlled by a range management system which allows WIP in stopped ranges to possibly move at a lower priority than other WIP that is not associated with a stopped range. The system and method of the invention can be implemented with any type of lean manufacturing system, such as, for example, by modifying known systems such as IFS APPLICATIONS by IFS, of Schaumburg, Ill. The flow may be part or all of a manufacturing processes in a fabrication facility. The manufacturing process may be, for example, the manufacture of silicon wafers.

In FIG. 2, the ranges are labeled sequentially along the x-axis, and the level of WIP (e.g., number of wafers) in each range is measured along the y-axis. In this example, WIP moves from left to right along the x-axis, such that after WIP in range 57 is processed, it will move to range 56, then to range 55, and so on. This provides predictability because a user may determine the expected completion date for any lot by knowing the range number that the lot is currently in.

In the example shown in FIG. 2, a solid line represents an amount of WIP in a range and a solid circle represents a throughput target for the range. The throughput target represents a desired amount of WIP to be processed in a particular range in a particular time period. For example, the throughput target may represent a desired number of wafers to be processed in the operations of the range in a given range day. The desired number may be the maximum number of wafers that could possibly be processed in that range in the range day, or may be some other number as determined by the range management system.

In the example of FIG. 2, the throughput target may vary for each range. The throughput target, as well as the flow definitions, range definitions, and the amount of WIP in any range, is data that is readily available from range management data, which is part of the range management system.

As seen in the example of FIG. 2, range 35 has a WIP level of approximately 190, range 34 has a WIP level of approximately 315, and range 33 has a WIP level of approximately 0. In range 34, the WIP level is significantly higher than the throughput target, possibly indicating a disruption (e.g., broken machine or tool, etc.). When the range management system identifies that the WIP level in a range exceeds the throughput target for the range by a predetermined amount or factor, the system will stop the range that is immediately upstream. Thus, as shown in FIG. 2, the range management system has stopped range 35 by setting the throughput target for range 35 to zero. This will prevent any WIP from moving from range 35 to range 34, where the potential problem exists. However, embodiments of the invention allow the WIP in stopped ranges (e.g., range 35) to be processed within the stopped range, instead of being completely stopped for the entire range day.

Figure 3:
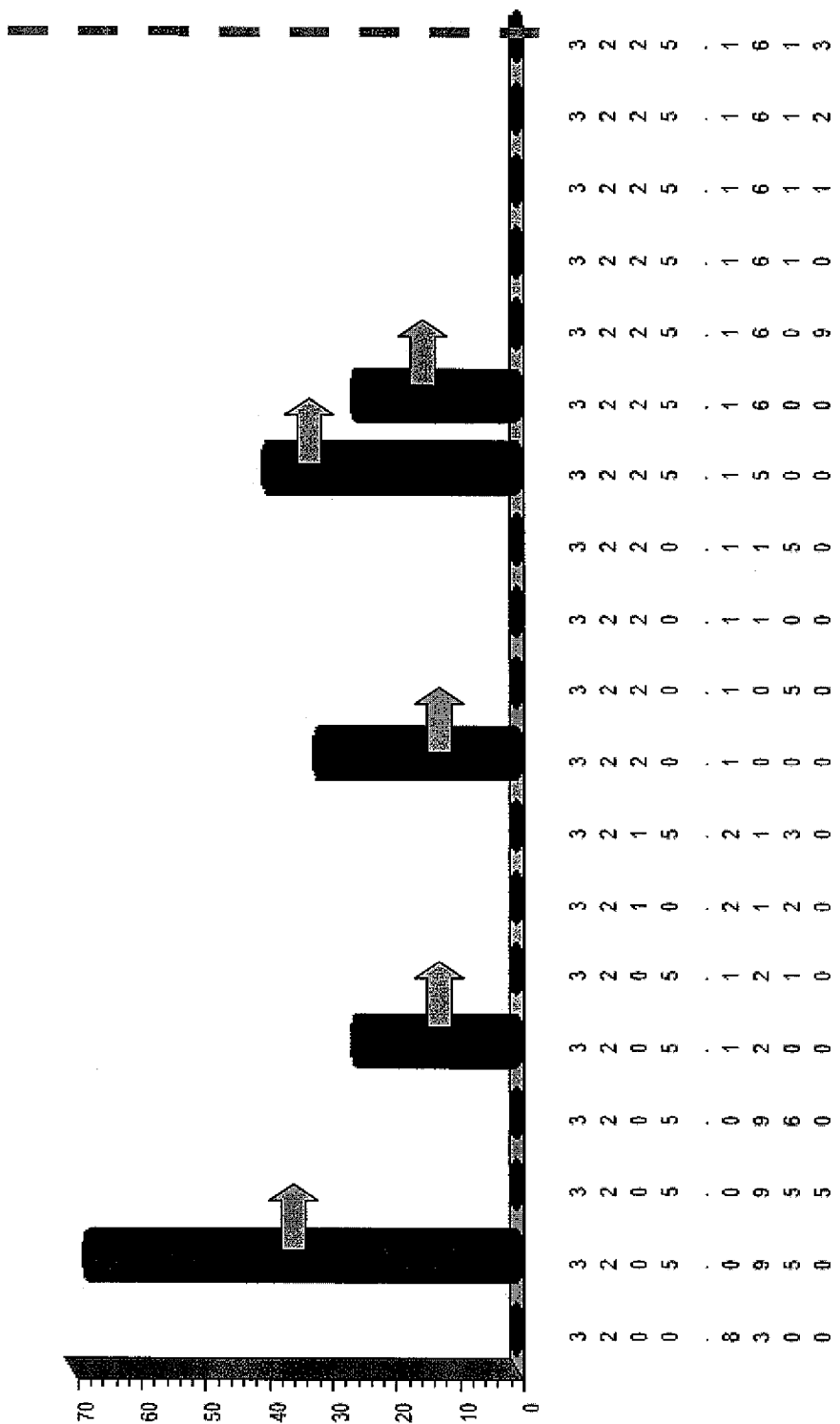
FIG. 3 shows a further aspect of the invention.

FIG. 3 shows exemplary details of a range (such as, for example, range 35 from FIG. 2). Operations within the range are labeled along the x-axis, and the level of WIP (e.g., number of wafers) in each operation is measured along the y-axis. In this example, WIP moves from left to right along the x-axis, such that after WIP in operation 3200.8300 is processed, it will move to operation 3205.0950, then to operation 3205.0955, and so on.

In conventional range management systems, WIP that is within a stopped range will not be processed during the range day. Thus, the WIP will remain in its current operation, even if the tool(s) performing this process happen to become idle (e.g., is not being used to process other non-stopped WIP). Implementations of the invention, however, provide for the processing of WIP within stopped ranges. Thus, WIP in stopped ranges can continue to be processed (e.g., move to the right, as shown in FIG. 3), albeit it at a lower priority relative to WIP in non-stopped ranges, until it reaches the last mandatory operation within the stopped range at which point it will be stopped. This allows operations that may become idle to be utilized, and improves the staging of the WIP within the stopped range so that the fabrication facility may recover more quickly when the stop is lifted.

A mandatory operation is one that all of the lots of WIP in a range are required to go through. Conversely, a non-mandatory operation is an operation that only some, but not all, of the lots in the range go through. For example, a non-mandatory operation may be used for sampling for quality control purposes. In the example shown in FIG. 3, operation 3225.1613 may be a sampling operation that only one out of every ten lots in the range must go through. Thus, operation 3225.1613 would be a non-mandatory operation. On the other hand, operation 3225.1612 may be an operation that all of the lots in the range must go through. Thus, operation 3225.1612 would be the last mandatory operation in the range (since there are no other mandatory operations to the right of it in FIG. 3). In embodiments of the invention, WIP that is allowed to move within a stopped range is not allowed to move beyond the last mandatory operation within the range, thus maintaining range management principles of flow control.

Figure 4:
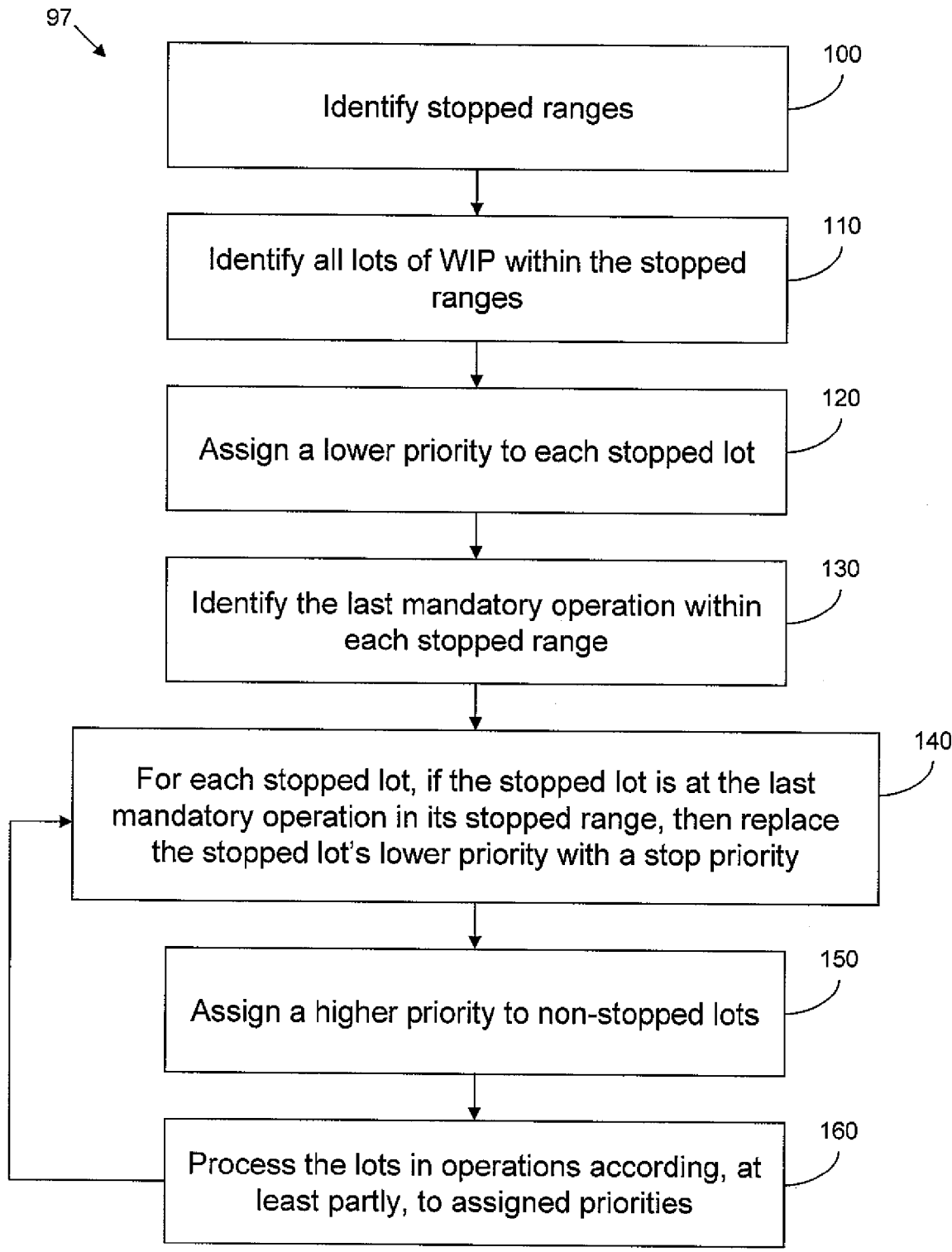
FIG. 4 shows flow diagram according to an aspect of the invention.

FIG. 4 is a flow diagram implementing steps of the invention. FIG. 4 may equally represent a high-level block diagram of the invention. The steps of FIG. 4 (and all of the flow diagrams) may be implemented and executed from either a server, in a client server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements, or the invention can be executed entirely or partially manually. The steps of FIG. 4 (and all other flow diagrams) may also be representative of a high-level block diagram implementing the steps thereof.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The processes described herein can be implemented in the infrastructure shown in FIG. 1.

FIG. 4 shows a flow diagram depicting a system 97 and method for handling WIP in stopped ranges according to embodiments of the invention. At step 100, all of the stopped ranges are identified. This can be done, for example, by the range management system or by accessing range management data from the range management system.

At step 110, all WIP that is within a stopped range is identified. In embodiments, this can be done by identifying any lots that are within the stopped ranges. This can be done, for example, by using the range definitions available from the range management system in conjunction with floor control data from the floor control system to identify any lot that is currently within a stopped range. As will be understood by the skilled artisan, a floor control system is a system that is capable of performing functions such as, for example, monitoring the lots and operations of a fabrication facility. Any lot identified in step 110 is referred to as a "stopped lot", and any lot that is not identified as being in a stopped range is referred to as a "non-stopped lot".

At step 120, each stopped lot is assigned a lower priority. In embodiments, a lower priority refers to a processing priority for the stopped lot that will be lower relative to the processing priority of every non-stopped lot. In other words, if a non-stopped lot and a stopped lot are waiting in a queue for processing in the same operation, then the non-stopped lot will be processed ahead of the stopped lot in that particular operation.

In embodiments, the lower priority may be assigned to a stopped lot by associating a single number, letter, or other indicia, or any combination of numbers, letters, and/or other indicia with the stopped lot. In this manner, the floor control system can recognize the associated number/letter/indicia and control the manufacturing processes of the fabrication facility accordingly. For example, the number "3" may be associated with each stopped lot with a lower priority. For example, the lower priority, and all other priorities in implementations of the invention, may be assigned in the manner disclosed in co-pending U.S. application Ser. No. 11/393, 027, the disclosure of which is hereby incorporated by reference in its entirety.

At step 130, the last mandatory operation for each stopped range is identified. This can be done, for example, by using the range definitions available from the range management system in conjunction with floor control data from the floor control system. The range management system contains data regarding the range definitions, which includes a listing of each operation in each range. The floor control system contains data regarding which operations are mandatory and which are non-mandatory. Thus, the data from the two systems can be used to identify the last mandatory operation of each range the was previously identified as a stopped range.

In embodiments, steps 100, 110, 120, and 130 are performed at a predetermined time interval. For example, these steps may be performed once at the beginning of each range day (e.g., 24 hour period), although other times are contemplated by the invention. Also, the skilled artisan will recognize that steps 110, 120, and 130 can be performed in any desired order following initial step 100.

Still referring to FIG. 4, at step 140, each stopped lot is examined to determine if it is at the last mandatory operation within its range. If the stopped lot is not at the last mandatory operation, then it retains its lower priority. However, if the stopped lot is at the last mandatory operation of its range, then its lower priority is replaced with an assigned stop priority. In embodiments, the stop priority may be assigned to a stopped lot by associating a single number, letter, or other indicia, or any combination of numbers, letters, and/or other indicia with the stopped lot. In this manner, the floor control system can recognize the associated number/letter/indicia and control the manufacturing processes of the fabrication facility accordingly. For example, the number "9" may be associated with each stopped lot with a stop priority.

At step 150, all of the non-stopped lots are assigned a higher priority. In embodiments, the higher priority may be assigned to a non-stopped lot by associating a single number, letter, or other indicia, or any combination of numbers, letters, and/or other indicia with the non-stopped lot. In this manner, the floor control system can recognize the associated number/ letter/indicia and control the manufacturing processes of the fabrication facility accordingly. For example, the number "2" may be associated with each non-stopped lot with a higher priority.

At step 160, the lots in the fabrication facility are actually processed in the various operations. In embodiments, the processing of the lots is controlled by the floor control system, which will allocate resources according, at least partly, to the assigned priorities already described. For example, non-stopped lots with a higher priority will be processed in operations as normal. Stopped lots with a lower priority will only be processed in an operation if a non-stopped lot is not currently in need of the same operation. And stopped lots with a stop priority will not be processed in any operations at all. In this manner, implementations of the invention allow operations that may otherwise sit idle to process lots within stopped ranges that are not at the last mandatory operation of the range. Accordingly, the utilization of fabrication facility resources may be enhanced, while still maintaining the predictability provided by the flow control of range management.

In embodiments, steps 140, 150, and 160 are performed more frequently than steps 100, 110, 120, and 130. For example, steps 140, 150, and 160 may be performed once every thirty minutes, although other times are contemplated by the invention. In this manner, the priorities are updated throughout the range day, and stopped lots that began the day not in the last mandatory range may be assigned a stop priority if they happen to reach the last mandatory range during the range day.

Embodiments of the invention may be implemented as an independent entity or as part of a computer integrated production system. Embodiments may be directly integrated into a range management system or a manufacturing execution system (MES), as is commonly used in directing the production of semiconductor fabrication. Although the invention has been described with respect to semiconductor fabrication, it is understood that embodiments could be employed in other manufacturing processes, such as, for example, automobile manufacture.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

While the invention has been described in terms of embodiments, those skilled in the art will recognize that the invention can be practiced with modifications and in the spirit and scope of the appended claims.

What is claimed:

1. A method, comprising:
identifying a stopped range;
identifying at least one lot of WIP associated with the stopped range;
determining if the at least one lot is at a last mandatory operation of the stopped range; and
processing the at least one lot in at least one operation within the stopped range at a lower priority relative to other lots.

2. The method of claim 1, further comprising assigning the lower priority to the at least one lot.

3. The method of claim 2, further comprising changing the lower priority to a stop priority if the at least one lot is at the last mandatory operation.

4. The method of claim 2, further comprising stopping the processing on the at least one lot if the at least one lot is at the last mandatory operation.

5. The method of claim 2, further comprising assigning a higher priority to the other lots.

6. The method of claim 5, wherein the processing comprises processing the other lots in the at least one operation before processing the at least one lot in the at least one operation.

7. A method of implementing range stops in a fabrication facility controlled by range management, comprising:
identifying a stopped range;
identifying WIP associated with the stopped range and WIP not associated with the stopped range;
determining whether the WIP associated with the stopped range is at a last mandatory operation of the stopped range; and
processing the WIP associated with the stopped range and the WIP not associated with the stopped range based on priorities assigned thereto.

8. The method of claim 7, wherein the priorities assigned thereto include:
assigning a first priority to the WIP not associated with the stopped range;
assigning a second priority to the WIP associated with the stopped range;
assigning a third priority to the WIP associated with the stopped range when the WIP associated with the stopped range is at the last mandatory operation of the stopped range.

9. The method of claim 8, wherein:
the first priority is higher than the second priority, and the second priority is higher than the third priority, and
the first priority WIP is processed prior to the second priority WIP, and the third priority WIP is stopped.

10. The method of claim 8, wherein the assigning the third priority and the processing occur more frequently than the identifying a stopped range and the identifying WIP associated with the stopped range and WIP not associated with the stopped range.

11. The method of claim 7, wherein the processing comprises processing at least one of the WIP associated with the stopped range and the WIP not associated with the stopped range in an operation of the stopped range.

12. The method of claim 7, wherein the steps of claim 7 are performed using a computing device.

13. A system for prioritizing a plurality of lots, comprising at least one device that performs:
identifying a stopped range;
identifying at least one lot of WIP associated with the stopped range;
determining if the at least one lot of WIP is at a last mandatory operation of the stopped range;
assigning a first priority to the at least one lot of WIP;
assigning a second priority to at least one other lot of WIP that is not associated with the stopped range; and controlling processing of the at least one lot of WIP and the at least one lot of other WIP in an operation contained in the stopped range based at least partly on the first priority and the second priority.

14. The system of claim 13, wherein the at least one device further performs stopping processing on the at least one lot of WIP if the at least one lot of WIP is at the last mandatory operation.

15. The system of claim 13, wherein the assigning a second priority, the controlling processing, and the determining are performed more frequently than the identifying a stopped range, the identifying at least one lot of WIP, and the assigning a first priority.

16. The system of claim 13, wherein the second priority is higher relative to the first priority.

17. The system of claim 13, wherein the at least one device is utilized in a range management system or a manufacturing execution system.

18. The system of claim 13, wherein:
the at least one device comprises a computer usable medium including a computer readable program; and
the computer readable program, when executed on a computer, causes the computer to perform the identifying a stopped range, the identifying at least one lot of WIP, the assigning a first priority, the assigning a second priority, and the controlling processing.

* * * * *